Oct. 22, 1963  J. F. SAIFUKU  3,107,637
PINEAPPLE PLANTER
Filed Sept. 15, 1960  7 Sheets-Sheet 1

James F. Saifuku
INVENTOR.

BY *Clarence A. O'Brien*
*and Harvey B. Jacobson*
Attorneys

Oct. 22, 1963     J. F. SAIFUKU     3,107,637
PINEAPPLE PLANTER Filed Sept. 15, 1960     7 Sheets-Sheet 5

James F. Saifuku
INVENTOR.

Oct. 22, 1963 J. F. SAIFUKU 3,107,637
PINEAPPLE PLANTER
Filed Sept. 15, 1960 7 Sheets-Sheet 6

James F. Saifuku
INVENTOR.

United States Patent Office
3,107,637
Patented Oct. 22, 1963

3,107,637
PINEAPPLE PLANTER
James F. Saifuku, Kailua, Oahu, Hawaii
(99—1015 Manako St., Aiea, Oahu, Hawaii)
Filed Sept. 15, 1960, Ser. No. 56,224
15 Claims. (Cl. 111—3)

The present invention relates to a pineapple planting machine and is an improvement over my prior co-pending application Serial No. 683,791, filed September 13, 1957, now Patent No. 3,005,425.

The improvement of the pineapple planting machine of the present invention involves an easier and more convenient handling of the pineapple plants to be planted by the planting machine. In planting machines of the type herein involved, parallel planting beds are formed by a furrowing plow mounted on the machine, the bed subsequently being prepared by the laying of mulch paper therein against which the pineapple plants are set and then covered for subsequent growth in the field. The machine therefore includes in addition to the bed preparing mechanism, the loading station which receives the started pineapple plants to be replanted within the paper prepared beds from a plant receptacle on the machine. The plants are continuously moved at the loading station from the receptacle so that the operator may take a plant from the loading conveyor and deposit them within plant containers also moving past the loading station. The plants which remain on the loading conveyor are returned to the plant receptacle by a return conveyor mechanism. Those plants which have been deposited within the plant containers are then delivered by the planting mechanism to a planting station also mounted on the machine at which location the plants are removed from the containers by a guide bar which positions the plants within the prepared furrow bed. The machine also includes a covering plow which moves earth over the plants as they are being brought to the planting station by the moving plant containers. It will be appreciated that the conveyor mechanism for moving the plant containers is necessarily geared to the movement of the machine along the field so as to properly space the plants deposited from the plant containers at the planting stations on the machine. However, the speed of movement of the plant containers at the planting station is not necessarily the convenient speed for accommodating the operator in loading the containers at the loading station. Accordingly, the improvement of this invention involves the plant container conveying mechanism which will slow down the movement of the plant containers as they move past the loading station so as to enable the operator to more readily load the plant containers with plants from the loading conveyor.

It is therefore a primary object of this invention to provide a pineapple planting machine which facilitates handling of the plants in loading them into the containers for delivery to a planting station from which the plants are positioned in the prepared furrow beds.

Another object of this invention is to provide a planting mechanism synchronized with the forward movement of the planting machine so as to properly space the plants within the beds and yet enable the planting mechanism to be loaded by the operator with adequate time for more proper and selected loading of the plants.

A still further object of this invention is to provide a plant handling mechanism for pineapple planting machines arranged on a planting machine in such a manner relative to the other machine components as to enable more reliable and accurate planting of the plants.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
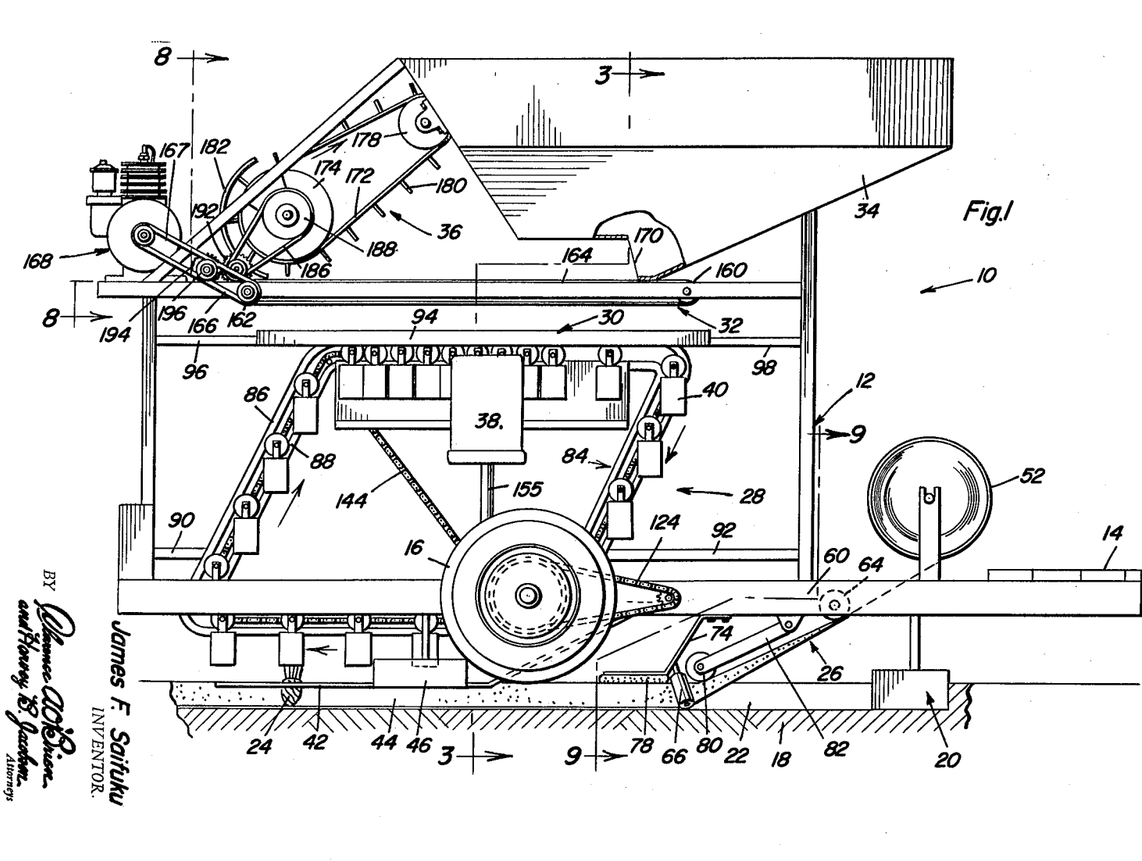
FIGURE 1 is a side elevational view of the pineapple planting machine made in accordance with this invention.
Figure 2:
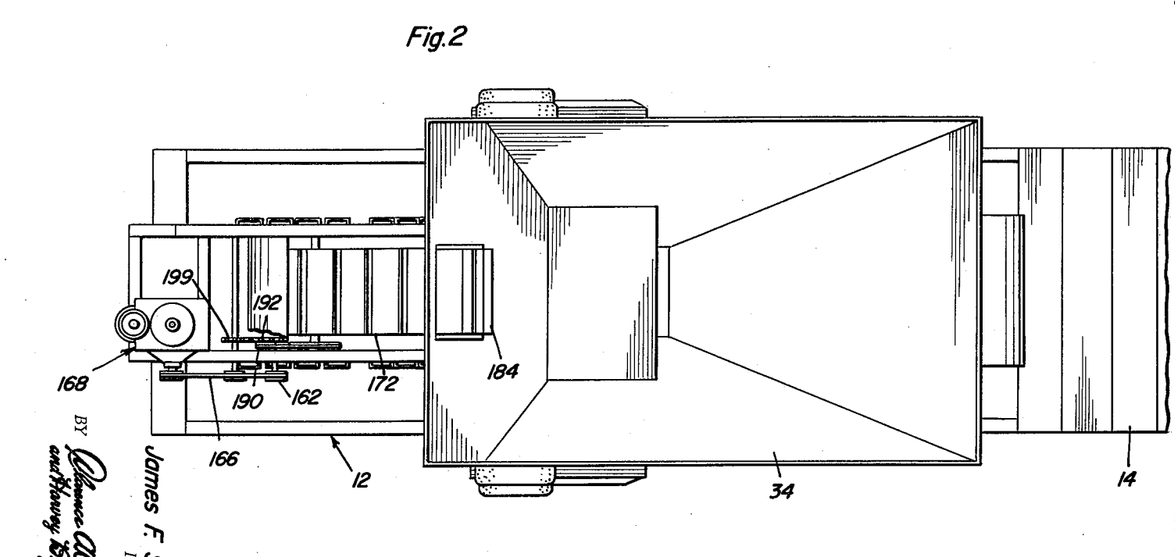
FIGURE 2 is a top plan view of the machine illustrated in FIGURE 1.

Referring now to the drawings in detail, FIGURE 1 illustrates more completely the entire planting machine which is generally designated by reference numeral 10. The machine 10 is mounted on a frame assembly generally generally indicated by reference numeral 12 having a forward platform portion 14 that may be hitched to a tractor vehicle in any suitable manner for movement of the machine frame 12 through the field. The frame assembly 12 is therefore provided with a pair of wheels 16 in order to space the frame assembly 12 above the ground 18. Mounted on the frame and extending therebelow adjacent the forward end of the machine are furrowing bed forming plows 20 which form a furrow bed 22 within which the pineapple plants 24 are set by the planting machine. A paper laying mechanism generally indicated by reference numeral 26 is therefore provided in order to prepare the planting bed. Following the bed forming plow and paper laying mechanism 26 on the machine frame assembly 12 is a plant conveying mechanism generally indicated by reference numeral 28 which delivers the plants to a planting station below the frame assembly 12 adjacent a rear portion thereof. The conveying mechanism 28 receives the plants from a loading station 30. The operator therefore removes the plant at the loading station 30 from the loading conveyor generally indicated by reference numeral 32 which is spaced above and parallel to the loading station 30 which conveyor mechanism 32 receives the plants from a plant bin 34. Those plants that remain on the loading conveyor 32 either rejected by the operator or those plants to which the operator was unable to attend, are returned to the plant bin 34 by means of an excess plant return conveyor mechanism generally indicated by reference numeral 36. The machine frame assembly 12 accordingly mounts the operator's seat 38 in such a position on the machine 10 so that the operator may conveniently remove pineapple plants from the loading conveyor 32 at the loading station 30 and deposit the plants within containers 40 conveyed by the conveyor mechanism 28 to the planting station so that a planting guide member 42 may position the pineapple plants 24 against the paper 44 applied to the planting bed by the bed preparing mechanism 26. A covering plow 46 is also provided and connected to the frame for moving dirt onto the pineapple plants 24 as they are brought to the planting station by the containers 40.

Figure 10:
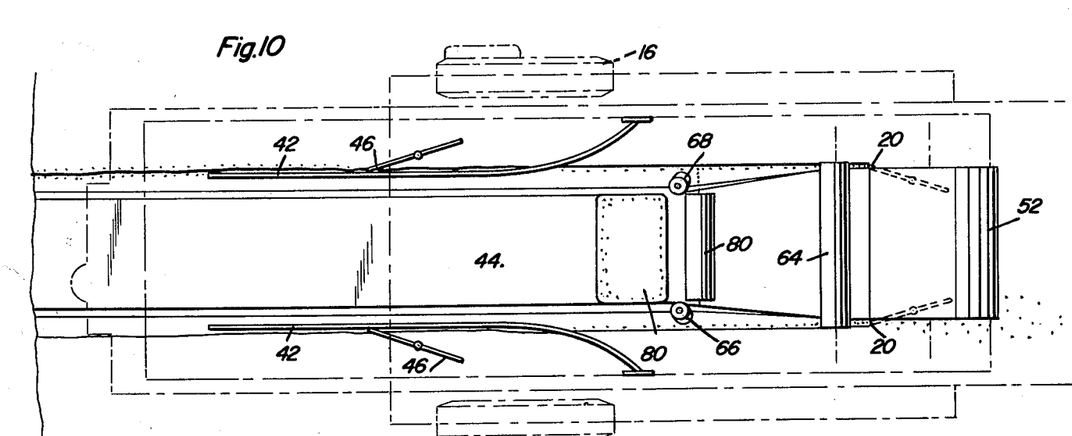
FIGURE 10 is a top plan view of the planting bed preparing mechanism of this invention.
Figure 11:
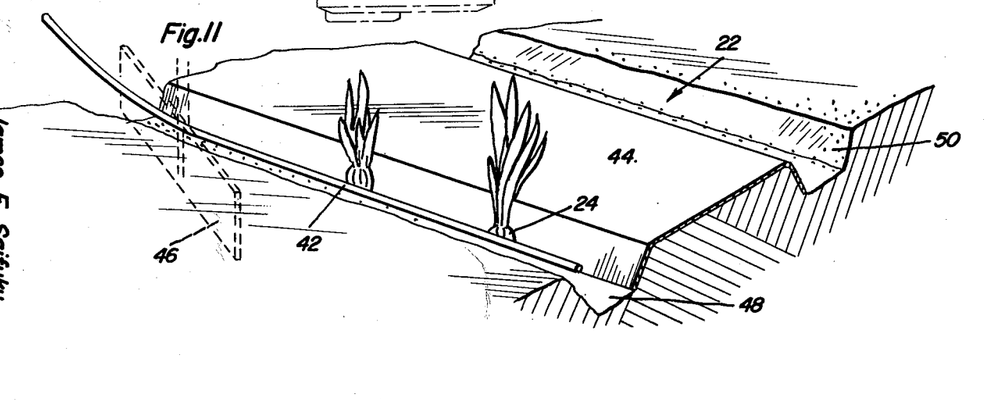
FIGURE 11 is a partial perspective view illustrating the manner in which the planting beds are prepared and plants set therein.

Referring now to FIGURES 1, 9, 10 and 11, it will be observed that the furrowing bed forming plows 20 at the forward end of the frame assembly 12 will form a pair of furrow beds 48 and 50 as more clearly seen in FIGURE 11 in response to forward movement of the machine frame 12 when pulled along the field by the tractor vehicle to which it is hitched. The paper 44 is laid between the furrows 48 and 50 of bed 22 so as to protect and space the adjacent sides of the furrows 48 and 50. Accordingly, the bed preparing mechanism 26 includes a paper roll carrier 52 rotatably mounted adjacent the forward end of the frame assembly 12. The roll carrier 52 is rotatably mounted on a roller shaft 54 between bearing standards 56 and 58 suitably attached to the side frame members 60 and 62 of the frame assembly 12, as more clearly seen in FIGURE 9. The paper 44 is drawn from beneath the roller 52, beneath the guide roller 64 and the sides thereof pressed against the adjacent inner sides of the furrows 48 and 50 by means of angled forming rollers 66 and 68. Bracket members 74 and 76 are secured to the bottom of the frame members 60 and 62 respectively and rotatably support therebetween at the lower ends thereof the side forming rollers 66 and 68. The bracket members 74 and 76 also mount a hold-down mat 78 disposed rearwardly of the side forming rollers 66 and 68. The paper 44 is thus held onto the dirt with the requisite pressure by means of the pressure roller 80 and neatly formed and folded between the furrows 48 and 50 by means of the side forming rollers 66 and 68 and the hold-down mat 78.

Figure 3:
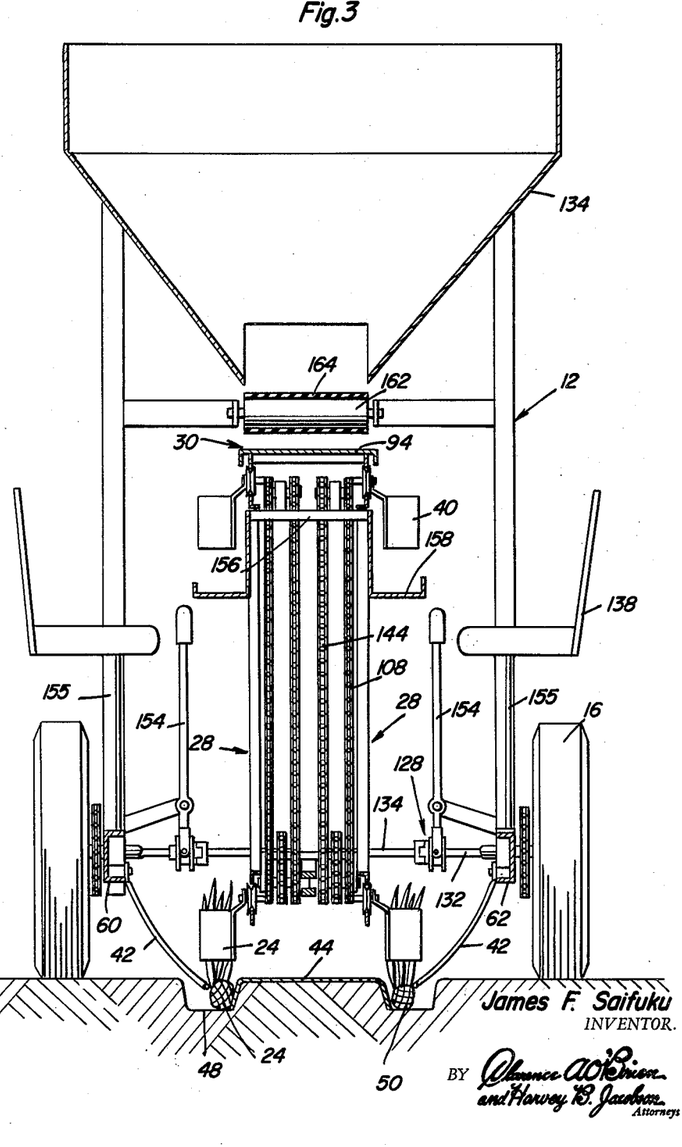
FIGURE 3 is a sectional view taken substantially through a plane indicated by section line 3—3 in FIGURE 1.

It will therefore be evident from FIGURES 1, 3, 10 and 11 that the plant containers 40 which bring the plant 24 contained therein beneath the frame members 60 and 62 of the frame assembly 12 adjacent the rear portion of the machine as viewed in FIGURE 1 cause the bottom of the plant 24 to be contacted by the curved plant guiding bars 42 which press the plants 24 against the sides of the paper 44 lining the sides of the furrows 48 and 50 in order to remove the plants 24 from their containers 40 and set the plants against the inner sides of the furrows 48 and 50. The planting guide bars 42 as more clearly seen in FIGURES 3 and 10 are fastened to the frame members 60 and 62 and extend therebelow into the furrows 48 and 50. Also connected to the frame members 60 and 62 are a pair of covering plows 46 which direct dirt against the plant 24 as they are brought into the furrows by the plant containers 40 being moved by the conveyor mechanism.

Figure 4:
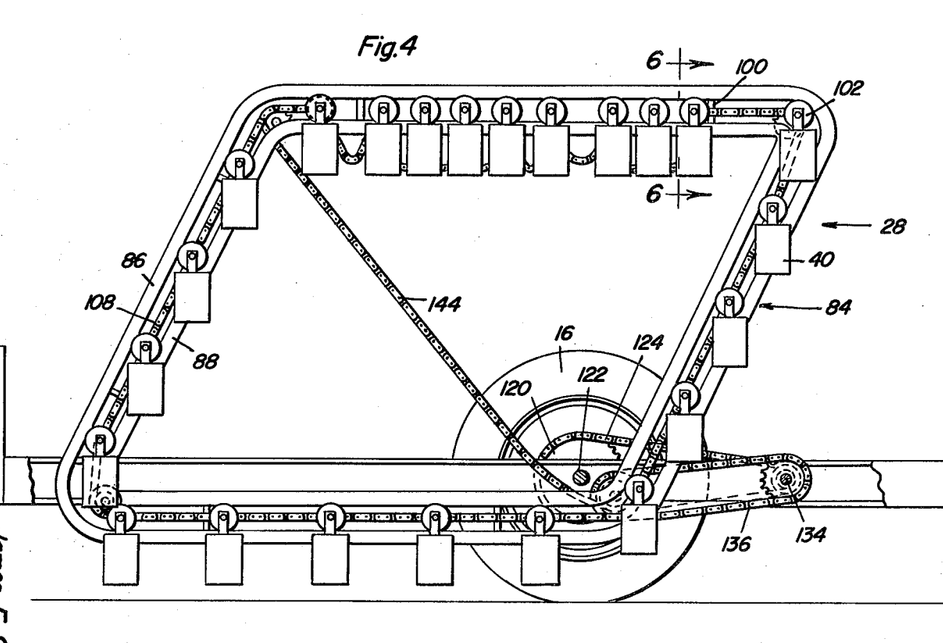
FIGURE 4 is a partial sectional view of the machine illustrating the plant conveying mechanism thereof.
Figure 5:
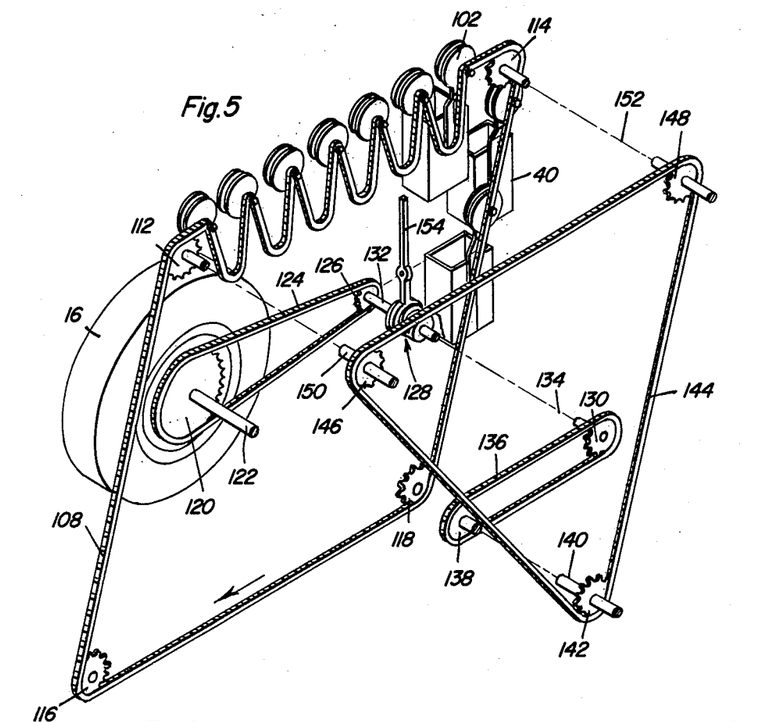
FIGURE 5 is a schematic perspective view of the drive mechanism for the plant conveying mechanism.
Figures 6, 7:
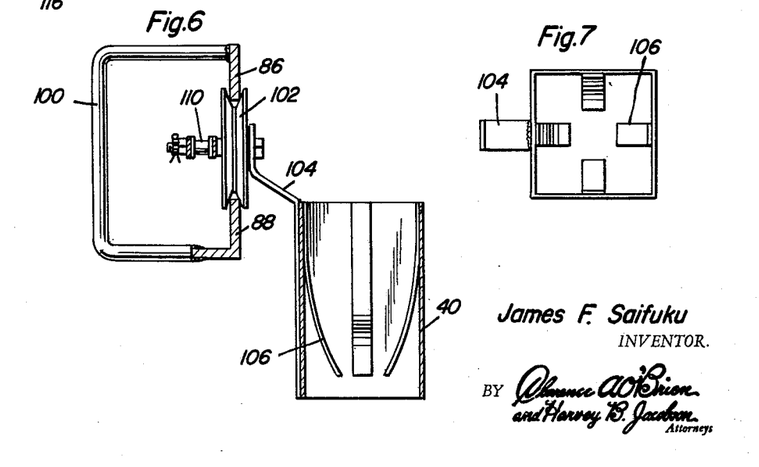
FIGURE 6 is a sectional view taken through a plane indicated by section line 6—6 in FIGURE 4.
FIGURE 7 is a top plan view of a plant container utilized in the planting machine of this invention.
Figure 8:
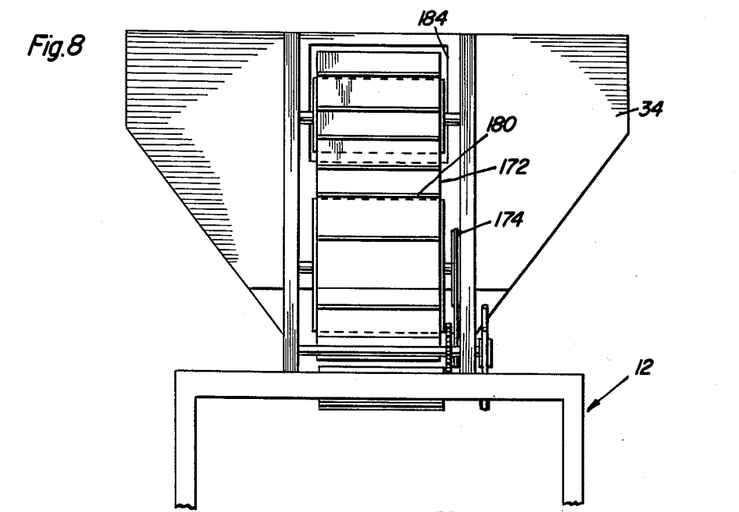
FIGURE 8 is a partial sectional view taken substantially through a plane indicated by section line 8—8 in FIGURE 1.
Figure 9:
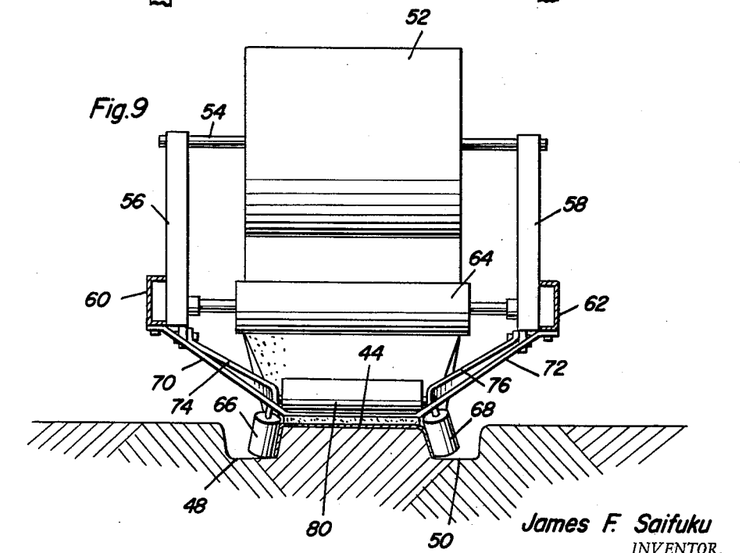
FIGURE 9 is a partial sectional view taken substantially through a plane indicated by section line 9—9 of FIGURE 1.

Referring now to FIGURES 1, 4 and 5, in particular it will be observed that the conveyor mechanism 28 includes a track frame assembly generally indicated by reference numeral 84 having a substantially rhombus configuration and formed by a pair of parallel track members including outer track member 86 and inner track member 88. The outer track member 86 is therefore fastened to the frame assembly 12 in any suitable manner as for example by a plurality of connecting members 90 and 92 as seen in FIGURE 1 as well as by being welded to the loading station platform member 94 which is secured to the frame assembly 12 by connecting members 96 and 98 and positioned below and adjacent the conveyor belt 32 from which the operator removes the plants for deposit into containers 40 on the conveyor mechanism 28. The platform 94 is thus a convenient storage space for plants cleared from the conveyor belt 32 before return to the bin 34 if desired for various purposes as for standby deposit into containers 40 or for storing plants found unsuitable for planting. The inner track member 88 is therefore spaced from the outer track member and connected thereto by a plurality of connecting spanning members 100 welded to the outer and inner track member as more clearly seen in FIGURE 6. It will therefore be apparent that the containers 40 which are tubular members of any suitable cross section are guided between the outer and inner track members 86 and 88 by means of roller wheels 102 rotatably mounted on a bracket member 104 which is affixed to one side of the container 40. As more clearly seen in FIGURE 6 the wheel 102 is engaged between the inner and outer track members so as to confine the containers 40 to a rhombus-like path as illustrated in FIGURES 1, 4 and 5. The containers 40 as seen in FIGURES 6 and 7 are therefore provided within with retaining spring elements 106 effective to so engage the upper foliage portion of the plants as to prevent a plant from completely falling out of the bottom thereof when deposited in the container 40 at the loading station 30. The retaining elements 106, however, do not prevent the plants from being deposited within the furrows 48 and 50 when the lower portions thereof exposed below the bottom of the containers as shown in FIGURES 1 and 3, are engaged by the planting guide bars 42 for separation of the plants from the containers when positioned within the furrows.

In order to properly move the containers along the track frame 84 from the loading station 30 to the planting station, an endless flexible sprocket chain 108 is provided. The bracket members 104 for each plant container 40 is therefore connected to the endless sprocket chain 108 by means of the mounting shaft 110 for the wheels 102, the containers thus being connected to the endless chain 108 at equally spaced intervals therealong. The chain 108 is therefore entrained about a pair of equal size upper driving sprocket wheels 112 and 114 driven at the same speed and a pair of lower idler sprocket wheels 116 and 118 disposed adjacent the corners of the track frame assembly 84 laterally spaced from but disposed intermediate the outer and inner track members of the track frame assembly 84.

It will however, be observed from FIGURE 5 in particular, that the length of the endless chain 108 is greater than the rhombus-like perimeter defined by the corner sprocket wheels 112, 114, 116 and 118. Accordingly, at the upper run portion of the endless chain 108, the chain will have considerable slack including slack portions between the containers that sag under the influence of gravity so that the containers 40 will be spaced more closely to each other than the containers being moved along the other three sides of the track frame assembly 84. It will therefore be apparent, that movement of the endless chain 108 at a constant linear speed by the driving corner sprocket wheels 112 and 114 will cause the containers 40 to move at a slower speed with respect to the upper track portion than along the lower or side portions of the track since a greater length of chain driven at the same linear speed traverses the upper track portion. As a result thereof, the speed of the connecting chain 108 for the plant containers 40 may be so geared to the forward movement of the machine 10 as to deliver the plants to the planting station at the proper rate of speed for setting within the furrows at the proper distance apart. Nevertheless, in view of the reduced rate of movement of the containers along the upper run of the track which is adjacent to the loading station 30, the operator will have a slower moving set of plant containers within which he may more easily deposit the plants with accuracy and selectivity.

As was noted hereinbefore, the conveying chain 108 for the plant containers 40 is driven so as to be synchronized with the forward movement of the machine for proper spacing of the plants. Accordingly, the wheels 16 for the machine frame assembly 12 are drivingly connected to the conveying chain 108. A drive sprocket 120 is therefore fixed to the wheel axle 122 interconnecting the wheels 16 which drive sprocket is belt chain connected by means of belt 124 to a sprocket wheel 126 located forwardly of one wheel 16. A clutch mechanism 128 therefore interconnects the sprocket wheel 126 with a second sprocket 130. The selective clutch mechanism 128 is therefore disposed between shafts 132 and 134 connected respectively to the sprocket wheels 126 and 130 and disposed transversely of the frame. The sprocket wheel 130 on the other end is belt connected by means of belt chain 136 to an input sprocket wheel 138 disposed rearwardly of the wheel 130 and adjacent to the wheel axle 22. Input sprocket wheel 138 is connected to a drive shaft 140 to which sprocket wheel 142 is also connected. Drive sprocket wheel 142 therefore drives an endless drive sprocket chain 144 which is also entrained about sprocket wheels 146 and 148 disposed in a vertical plane laterally spaced from the conveyor chain 108 as more clearly seen in FIGURE 5. The sprocket wheel 146 is connected to the conveying chain sprocket 112 by means of shaft 150 while sprocket wheel 148 is connected to the corner sprocket wheel 114 by means of shaft 152.

From the foregoing description therefore it will be appreciated that forward movement of the machine frame assembly 12 will be reflected by rotational movement of the wheels 16 whereby the conveyor chain 108 is driven at any desired ratio thereto. It will also be appreciated that the drive connection hereinbefore described may be disconnected by selective control of the clutch mechanism 128 which disconnects the shafts 132 and 134 by manipulation of the clutch control lever 154.

Referring now to FIGURE 3 in particular, it will be observed that two conveyor mechanisms 28 are disposed on each side of the machine frame assembly 12, each of which conveyor mechanisms are identical in construction. It will therefore be observed that the seats 138 for the operator are conveniently supported by the frame members 60 and 62 upon standards 155 and are therefore disposed adjacent to the clutch control levers as well as being disposed adjacent to the loading station 30. Both of the conveyor mechanisms 28 are therefore mounted on the frame in spaced relation to each other by means of the loading platform 94 and an intermediate connecting member 156 to which collecting troughs 158 are connected on the outside of the conveyor mechanism 28 so as to prevent refuse matter from the plants as they are loaded into the containers 40 adjacent to the loading platform 94 from falling below onto the drive mechanism. It will therefore be apparent that the seats 138 are so located that the operator seated thereon may easily handle the plants for depositing them into the plant containers.

Referring now to FIGURES 1, 2, 3 and 8 it will be apparent that the plants which are loaded from the loading station 30 into the containers 40 are received from the conveyor mechanism 32. Accordingly, conveyor belt rollers 160 and 162 are rotatably mounted by the frame assembly 12 in spaced relation above the loading platform member 94. The belt 164 is therefore entrained about the end rollers 160 and 162 and move in such a direction so that the upper run thereof moves toward the driving end of the conveyor mechanism 32 at the roller 162. Accordingly, the roller 162 is driven by means of a belt 166 from a power plant or internal combustion engine 168. It will therefore be apparent that the plants deposited on top of the conveyor belt 164 from the plant bin 34 from an outlet end 170 will be moved along toward the opposite end of the belt mechanism 32 at a slow speed so as to afford the operator an opportunity to remove the plants from the top of the belt 164 in order to load them into the plant containers 40.

It will be apparent however that an excess of plants may remain on top of the loading conveyor belt 164 at the driving end of the loading conveyor belt. Accordingly, a mechanism generally indicated by reference numeral 36 is provided in order to return the excess plants to the plant bin 34. The mechanism 36 therefore includes a return belt 172 moving in a clockwise direction as viewed in FIGURE 1 which belt 172 entrained about a driving pulley 174 and an idler pulley wheel 178 is rotatably mounted adjacent the upper end of the plant bin 34. Rubber-like fingers 180 are therefore provided on the exterior surface of the return belt 172 for engaging the excess plants on the loading conveyor belt 164 and moving them upwardly between the belt 172 and the deflector member 182 onto the upper run of the belt 172 for return to the bin 34 through an opening 184 provided therein for such purpose as more clearly seen in FIGURE 8. Appropriate drive mechanism is provided in order to power the drive wheel 174 from the gasoline engine 168. Accordingly, a belt 186 drivingly connects the driving pulley 188 connected to the belt drive wheel 174 to a pulley wheel 190 which is connected to a gear member 192. The gear member 192 is geared to a second gear member 194 which in turn is connected to a drive pulley wheel 196 engaged with an engine driven belt 167. Accordingly, the engine 168 will drive the return belt drive wheel 174 in a clockwise direction in order to engage and return the excess plants on top of the upper run of the loading belt 164.

From the foregoing description, operation and utility of the planting machine of this invention will be apparent. Summarizing however the operation thereof it will be recalled that the machine frame assembly 12 is drawn along the field by means of a tractor to which it is hitched. Accordingly, as the frame moves along and over the ground a pair of bed forming plows 20 form a pair of spaced parallel furrows. The bed preparing mechanism 26 is therefore provided on the machine frame 12 including a paper roll carrier 52 which feeds out a continuous roll of paper, the paper being guided below the guide roller 64 and pressure roller 80 to be folded onto the mound formed between the furrows 48 and 50 by means of the guiding rollers 66 and 68 and the hold-down mat 78. The plants are subsequently set within the paper furrows 48 and 50 by means of guide bars 42 which position and remove the plants from plant containers 40 moving past the guide bars 42. Earth covering plows 46 are therefore also mounted on the frame assembly in order to direct earth for covering the bottom of the plants subsequently positioned within the furrows 48 and 50. The conveyor mechanisms 28 for delivering the plants to the planting station defined by the guided bars 42 includes endless conveyor chain 108 having a slack upper run portion whereupon driving of the conveyor chain will cause the plant containers to move at a slower rate along the upper run as compared to the rate of movement of the plant containers on the other runs of the track assembly 84. Accordingly, the conveyor chain moving the plant containers 40 is drivingly connected to the vehicle wheels 16 so as to properly place the plants 24 deposited therefrom to the furrows. The upper run of the conveyor mechanism 28 moving the plant containers at a slower rate accordingly provides the operator conveniently positioned by means of the seat 38, adequate time within which to load the plants at the loading station 30 within the plant containers 40. Selective clutch mechanism 128 is therefore also provided so as to enable the operator to disconnect the drive from the conveyor mechanism 28 when any particular difficulty arises with regard to the planting or when it is desired to stop operation of the machine. In order to supply the operator with plants for loading purposes a conveyor belt mechanism 32 is provided above the loading station 30 which moves from one end to the driving end. A plant bin or receptacle 34 is therefore provided from which the plants drop onto the loading belt mechanism 32 for movement to the driving end thereof. Excess plants reaching the driving end of the loading conveyor mechanisms 32 are therefore returned to the plant bin by means of a return mechanism 36 which includes a continuously moving return belt 172 having finger projections 180 thereon which carry the excess plants upwardly between the belt and a deflector 182 to an upper run of the belt for movement into an opening 184 adjacent the top of the plant bin 34. An engine 168 is therefore provided for continuously operating the return mechanism and the loading conveyor mechanism 32.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pineapple planting machine comprising, frame means, wheel means rotatably supported in said frame means for wheeled support thereof in spaced relation above the ground, bed forming plow means mounted forwardly of said frame means for forming a furrow planting bed having side walls formed in response to forward movement of the frame means, paper carrier means mounted on said frame means, paper guide means mounted on said frame means and extending therebelow for guiding and laying paper from said carrier means in the furrow bed and covering at least one of said side walls, plant delivery receiving means mounted on said frame means and including drive means operative in response to forward movement of the frame means to move slowly past a loading station on the frame means for receiving plants with portions thereof exposed and move more rapidly past a planting station below the frame means, planting guide means mounted on said frame means and extending therebelow to said planting station and disposed adjacent to said one of said side walls for cooperatively engaging said exposed portions of said plants against said one of the side walls for withdrawing and positioning the plants in the furrow bed against the paper, and covering means mounted on said frame means for directing earth against the plants and said side wall in the furrow bed to position said plants in the furrow planting bed.

2. The combinaion as defined in claim 1, including loading conveyor means mounted on said frame means in parallel spaced relation to the loading station, plant receptacle means mounted on said frame means above said conveyor means for delivery of plants to one end of said loading conveyor means for movement of the plants along the loading station by the loading conveyor means and return conveyor means mounted on the frame means adjacent the other end of the loading conveyor means for returning unloaded plants remaining on the loading conveyor means to the plant receptacle means.

3. The combination of claim 1 wherein said plant delivery receiving means comprises a plurality of plant container means and conveying means drivingly connected to said container means for movement thereof more slowly past the loading station and more rapidly past the planting station.

4. The combination of claim 3, wherein said drive means is drivingly connected to the wheel means and disconnectible therefrom by selectively operable clutch means.

5. The combination of claim 4, wherein said conveying means includes track means engageable with the container means for guiding the container means between the loading station and the planting guide means, flexible connecting means interconnecting said spaced container means at fixedly spaced locations therealong and said drive means being operatively connected to said flexible connecting means to move the container means along the track means in closer spaced relation adjacent to the loading station.

6. The combination of claim 5, wherein each container means comprises a tubular plant containing member having an open top and bottom, yieldable retaining means mounted within the tubular member engageable with a plant loaded into the tubular member for holding the plant with a portion exposed below the bottom and roller means connected to the tubular member and engageable with the track means.

7. The combination of claim 6, wherein said flexible connecting means comprises an endless sprocket chain of a length exceeding that of the track means and being connected to said container means at equally spaced points therealong.

8. In a pineapple planting machine having a plant loading station and a planting mechanism operatively located relative to the loading station for receiving plants therefrom and depositing the plants within furrow planting beds prepared beneath the machine by furrowing mechanism, said planting mechanism comprising, spaced plant container means for receiving plants at the loading station, planting guide means for removing and directing plants into the planting beds from the container means, continuously movable conveying means operatively located and drivingly connected to said container means for continuously moving the container means in a substantially vertical plane slowly past the loading station to receive said plants and more rapidly past the planting guide means which coacts with the plants and the planting bed for removal thereof from the container means, and covering means for directing earth against said plants deposited in the furrow planting beds and against sides of said furrow beds, said conveying means comprising fixed track means engageable with the container means for guiding the container means between the loading station and the planting guide means, flexible connecting means interconnecting said spaced container means at fixedly spaced locations therealong, and drive means operatively mounted on the track means and drivingly connected to the flexible connecting means for maintaining the flexible connecting means slack only adjacent to the loading station to move the container means in variably spaced single file relation with respect to the track means adjacent to the loading station.

9. The combination of claim 8 including a source of motive power drivingly connected to said drive means by a selectively operable clutch means operative to disconnect the drive means.

10. The combination of claim 9 wherein said flexible connecting means includes an endless sprocket chain of a length exceeding that of the track means and being connected to said container means at equally spaced points therealong.

11. The combination of claim 10 wherein each container means comprises a tubular plant containing member having an open top and bottom, yieldable retaining means mounted within the tubular member engageable with a plant loaded into the tubular member for holding the plant with a portion exposed below the bottom and roller means connected to the tubular member and engageable with the track means.

12. The combination of claim 8 wherein each container means comprises a tubular plant containing member having an open top and bottom, yieldable retaining means mounted within the tubular member engageable with a plant loaded into the tubular member for holding the plant with a portion exposed below the bottom and roller means connected to the tubular member and engageable with the conveying means.

13. In a machine for handling articles such as plants or the like having a forwardly moving frame, an article delivery mechanism comprising, a single conveyor means mounted on said frame for continuous movement of the articles in an upright position in a substantially vertical plane, article container means, said conveyor means including spaced track portions and flexible means operatively interconnecting said container means in fixedly spaced relation therealong for continuous single file movement along the spaced track portions, and drive means operatively connected to said flexible means independently of the container means for movement of said container means in fixedly spaced relation along a first of said track portions for deposit of said articles in said upright position and variably spaced relation between the container means along a second of said spaced track portions for loading of said articles in said upright position, said flexible means being rendered slack only along said second of the spaced portions by the weight thereof between the container means.

14. The combination of claim 13 wherein said second portion of the track means is horizontally disposed in parallel spaced relation to said first portion and said track means further including rearwardly inclined vertical connecting sections interconnecting said spaced portions of the track means.

15. The combination of a machine for laying mulch paper with downturned edges including a loading platform on which plants are placed, a plant depositing mechanism mounted on said machine and located below said loading platform for receiving plants therefrom, said plant depositing mechanism comprising, conveyor track means having vertically spaced portions including an upper portion in spaced adjacency below the loading platform and a lower portion located in spaced adjacency above the mulch paper for presenting plants in close spaced adjacency alongside downturned edges of the mulch paper as laid by the machine, means mounted on the machine for engagement with the plants presented along said lower portion to effect deposit thereof against downturned edges of the mulch paper, flexible conveying means operatively mounted on said conveyor track means for propelling plants more slowly along the upper portion than the lower portion in single file relation, and drive means operatively connected to the flexible conveying means for imparting movement thereto in slack condition only along the upper portion to variably space the plants received therealong.

References Cited in the file of this patent

UNITED STATES PATENTS

| | | |
|---|---|---|
| 620,299 | Frith | Feb. 28, 1899 |
| 1,178,408 | Paris | Apr. 4, 1916 |
| 1,802,273 | Richards | Apr. 21, 1931 |
| 1,864,872 | Rose | June 28, 1932 |
| 1,891,140 | Bur | Dec. 13, 1932 |
| 1,930,939 | Horner | Oct. 17, 1933 |
| 1,934,250 | Wynne | Nov. 7, 1933 |
| 1,963,591 | Pomieranic | June 19, 1934 |
| 2,358,507 | Haberstump | Sept. 19, 1944 |
| 2,487,354 | McNamara | Nov. 8, 1949 |
| 2,503,828 | Loucks | Apr. 11, 1950 |
| 2,637,287 | Strauss | May 5, 1953 |
| 2,749,855 | Guigas | June 12, 1956 |
| 2,831,442 | Montguire | Apr. 22, 1958 |
| 2,890,665 | Kanz | June 16, 1959 |
| 2,961,979 | Stanley | Nov. 29, 1960 |
| 3,005,425 | Saifuku | Oct. 24, 1961 |
| 3,031,966 | Leach | Apr. 24, 1962 |

FOREIGN PATENTS

| | | |
|---|---|---|
| 105,875 | Australia | Nov. 17, 1938 |
| 511,455 | Belgium | June 14, 1952 |
| 502,005 | Italy | Nov. 26, 1954 |